United States Patent
Kuznetsov

(10) Patent No.: US 9,129,008 B1
(45) Date of Patent: Sep. 8, 2015

(54) SENTIMENT-BASED CLASSIFICATION OF MEDIA CONTENT

(75) Inventor: Stacey Kuznetsov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 627 days.

(21) Appl. No.: 12/268,324

(22) Filed: Nov. 10, 2008

(51) Int. Cl.
*G06F 17/30* (2006.01)

(52) U.S. Cl.
CPC .............................. *G06F 17/30616* (2013.01)

(58) Field of Classification Search
USPC .......................................... 707/999.101, 737
See application file for complete search history.

(56) References Cited

U.S. PATENT DOCUMENTS

| | | | |
|---|---|---|---|
| 6,892,179 B1 | 5/2005 | Zacharia | |
| 7,043,473 B1 | 5/2006 | Rassool et al. | |
| 7,315,848 B2 | 1/2008 | Pearse et al. | |
| 7,523,085 B2 | 4/2009 | Nigam et al. | |
| 7,558,769 B2 | 7/2009 | Scott et al. | |
| 7,624,093 B2 | 11/2009 | Fortuna | |
| 7,685,091 B2 | 3/2010 | Boone et al. | |
| 7,720,835 B2 * | 5/2010 | Ward et al. | 707/710 |
| 8,515,828 B1 * | 8/2013 | Wolf et al. | 705/26.7 |
| 2005/0125307 A1 * | 6/2005 | Hunt et al. | 705/26 |
| 2006/0054007 A1 * | 3/2006 | Lu et al. | 84/611 |
| 2006/0069589 A1 | 3/2006 | Nigam et al. | |
| 2006/0242040 A1 | 10/2006 | Rader | |
| 2007/0016580 A1 | 1/2007 | Mann et al. | |
| 2007/0027672 A1 | 2/2007 | Decary et al. | |
| 2007/0078671 A1 * | 4/2007 | Dave et al. | 705/1 |
| 2007/0078833 A1 | 4/2007 | Chea et al. | |
| 2007/0124200 A1 * | 5/2007 | Simons et al. | 705/14 |
| 2007/0124432 A1 * | 5/2007 | Holtzman et al. | 709/219 |
| 2007/0143176 A1 | 6/2007 | Nong et al. | |
| 2007/0165904 A1 | 7/2007 | Nudd et al. | |
| 2007/0174343 A1 | 7/2007 | Fortuna | |
| 2007/0226204 A1 | 9/2007 | Feldman | |
| 2007/0266025 A1 | 11/2007 | Wagner et al. | |
| 2008/0005051 A1 | 1/2008 | Turner et al. | |
| 2008/0109391 A1 * | 5/2008 | Chan | 706/45 |
| 2008/0109428 A1 * | 5/2008 | Suciu et al. | 707/5 |
| 2008/0110322 A1 * | 5/2008 | Lee et al. | 84/611 |
| 2008/0133488 A1 * | 6/2008 | Bandaru et al. | 707/3 |
| 2008/0148317 A1 * | 6/2008 | Opaluch | 725/46 |
| 2008/0154883 A1 | 6/2008 | Chowdhury et al. | |
| 2008/0215571 A1 | 9/2008 | Huang et al. | |
| 2008/0249764 A1 * | 10/2008 | Huang et al. | 704/9 |
| 2008/0288481 A1 | 11/2008 | Zeng et al. | |
| 2009/0048823 A1 | 2/2009 | Liu et al. | |
| 2009/0083260 A1 * | 3/2009 | Artom et al. | 707/5 |

(Continued)

OTHER PUBLICATIONS

Article entitled "Building a Sentiment Summarizer for Local Service Reviews", by Blair-Goldensohn et al, dated Apr. 22, 2008.*

(Continued)

*Primary Examiner* — Mahesh Dwivedi
(74) *Attorney, Agent, or Firm* — Fenwick & West LLP

(57) ABSTRACT

A set of comments associated with an item of media content is identified. A set of sentiment scores associated with the set of comments is generated, wherein each sentiment score indicates a type of sentiment expressed in a comment. The sentiment profile is generated responsive at least in part to the set of sentiment scores, the sentiment profile indicating the types of sentiment expressed in comments associated with the item of media content and stored in association with the item of media content.

19 Claims, 13 Drawing Sheets

(56) References Cited

U.S. PATENT DOCUMENTS

| | | | |
|---|---|---|---|
| 2009/0089273 A1* | 4/2009 | Hicks | 707/5 |
| 2009/0112892 A1 | 4/2009 | Cardie et al. | |
| 2009/0125371 A1* | 5/2009 | Neylon et al. | 705/10 |
| 2009/0164417 A1* | 6/2009 | Nigam et al. | 707/2 |
| 2009/0193328 A1* | 7/2009 | Reis et al. | 715/231 |
| 2009/0248399 A1 | 10/2009 | Au | |
| 2009/0271417 A1* | 10/2009 | Toebes et al. | 707/100 |
| 2009/0281870 A1* | 11/2009 | Sun et al. | 705/10 |
| 2009/0282019 A1* | 11/2009 | Galitsky et al. | 707/5 |
| 2009/0319342 A1 | 12/2009 | Shilman et al. | |
| 2010/0030764 A1* | 2/2010 | Koren | 707/5 |
| 2010/0114788 A1* | 5/2010 | White et al. | 705/319 |
| 2010/0198773 A1* | 8/2010 | Wallisch | 706/54 |
| 2011/0040759 A1* | 2/2011 | Rappoport et al. | 707/737 |
| 2012/0046938 A1* | 2/2012 | Godbole et al. | 704/9 |

OTHER PUBLICATIONS

Article entitled "Opinion Observer: Analyzing and Comparing Opinions on the Web", by Liu et al., dated May 14, 2005.*

Aue, A., et al., "Customizing Sentiment Classifiers to New Domains: a Case Study," Submitted to RANLP-05, the International Conference on Recent Advances in Natural Language Processing, 2005, 6 pages.

Balog, K. et al, "Why are they excited? Identifying and Explaining Spikes in Blog Mood Levels," Proceeding EACL '06 Proceedings of the Eleventh Conference of the European Chapter of the Association for Computational Linguistics: Posters & Demonstrations, 2006, 4 pages, ISLA, University of Amsterdam, Netherlands.

Beineke, P., et al., *An Exploration of sentiment summarization*, Proceedings of the AAAI Spring Symposium on Exploring Attitude and Affect in Text: Theories and Applications, 2004, 3 pages.

Blitzer, J., et al., *Biographies, Bollywood, Boom-boxes and Blenders: Domain Adaptation for Sentiment Classification*, Proceedings of the 45th Annual Meeting of the Association for Computational Linguistics, Jun. 23-30, 2007, pp. 440-447.

Carenini, G., et al., *Multi-Document Summarization of Evaluative Text*, 11th Conference of the European Chapter of the Association for Computational Linguistics, Apr. 3-7, 2006, pp. 305-312.

Carenini, G., et al., *Extracting Knowledge from Evaluative Text*, Proceedings of the Third International Conference on Knowledge Capture, Oct. 2-5, 2005, pp. 11-18, ACM Press.

Choi, Y., et al., *Identifying Sources of Opinions with Conditional Random Fields and Extraction Patterns*, Human Language Technology Conference and Conference on Empirical Methods in Natural Language Processing, Oct. 6-8, 2005, pp. 355-362.

Gamon, M., et al., *Pulse: Mining Customer Opinions from Free Text*, Advances in Intelligent Data Analysis VI, 6th International Symposium on Intelligent Data Analysis, IDA 2005, Sep. 8-10, 2005, pp. 121-132.

Gindl, S., et al., "Generic High-Throughput Methods for Multilingual Sentiment Detection," 4th IEEE International Conference on Digital Ecosystems and Technologies, Apr. 12, 2010, 6 Pages, Dubai, United Arab Emirates.

Hu, M., et al., *Mining and Summarizing Customer Reviews*, Proceedings of the Tenth ACM SIGKDD International Conference on Knowledge Discovery and Data Mining, Aug. 22-25, 2004, pp. 168-177.

Hu, M., et al., *Mining Opinion Features in Customer Reviews*, Proceedings of the Nineteenth National Conference on Artificial Intelligence (AAAI-04), 2004, pp. 755-760.

Kamps, J., et al., "Using WordNet to Measure Semantic Orientations of Adjectives," Proceedings of the 4th International Conference on Language Resources and Evaluation LREC04, 2004, 4 pages.

Kim, S.-M., et al, "Determining the Sentiment of Opinions," Proceedings of the COLING Conference, 2004, pp. 1-8, Geneva.

Koppel, M. et al., "Good News or Bad News? Let the Market Decide," Dept. of Computer Science, 2006, 5 pages, Bar-Ilan University, Ramat-Gan, Israel.

Lee, L., "A Matter of Opinion: Sentiment Analysis and Business Intelligence (position paper)," Presented at the IBM Faculty Summit on the Architecture of On-Demand Business, May 17-18, 2004, 2 pages, Cornell University.

Lui, "Opinion Observer: analyzing and comparing opinions on the Web," Proceedings of the 14th International Conference on World Wide Web, May 10-14, 2005, ACM, pp. 342-351.

Mao, Y., et al., *Isotonic Conditional Random Fields and Local Sentiment Flow*, Proceedings of the 20th Annual Conference on Neural Information Processing Systems, Dec. 4-7, 2006, pp. 961-968.

McDonald, R., et al., *Structured Models for Fine-to-Coarse Sentiment Analysis*, Proceedings of the 45th Annual Meeting of the Association for Computational Linguistics, Jun. 23-30, 2007, pp. 432-439.

Melville, P., et al., "Sentiment Analysis of Blogs by Combining Lexical Knowledge with Text Classification," KDD'09, Jun. 28-Jul. 1, 2009, pp. 1275-1283.

Miller, G., *WordNet: A Lexical Database for English*, Communications of the ACM, Nov. 1995, pp. 39-41, vol. 38, No. 11.

Mishne, G. et al., "MoodViews: Tools for Blog Mood Analysis," American Associate for Artificial Intelligence, 2006, 2 pages, ISLA, University of Amsterdam, Netherlands.

"Moodgrapher," MoodViews: Tools for Blog Mood Analysis, 2005, 1 page, [Archived on web.archive.com on Dec. 14, 2007] [online] [Retrieved on Nov. 12, 2010] Retrieved from the Internet <URL:http://web.archive.org/web/20071214004346/http://www.moodviews.com/Moodgrapher/>.

"MPQA Releases—Corpus and Opinion Recognition System," 2 pages, [Archived on web.archive.com on Dec. 6, 2007] [online] [Retrieved on Nov. 12, 2010] Retrieved from the Internet <URL:http://web.archive.org/web/20071206160223/http://www.cs.pitt.edu/mpqa/>.

Na, J.C., et al., "A Sentiment-Based Meta Search Engine," Proceedings of the Asia-Pacific Conference on Library & Information Education & Practice, Apr. 3-6, 2006, pp. 83-89.

Na, J.C., et al., "Sentiment-Based Search in Digital Libraries," JCDL'05, Jun. 7-11, 2005, pp. 143-144.

Nasukawa, T. et al., "Sentiment Analysis: Capturing Favorability Using Natural Language Processing," Proceedings of the 2nd International Conference on Knowledge Capture, 2003, pp. 70-77, Sanibel Island, FL, USA.

Nielsen Buzzmetrics: The Global Measurement Standard in Consumer-Generated Media, BuzzMetrics, 2007, 1 page, [Archived on web.archive.com on Dec. 10, 2007] [online] [Retrieved on Nov. 12, 2010] Retrieved from the Internet <URL:http://web.archive.org/web/20071210041849/http://www.nielsenbuzzmetrics.com/>.

Opinmind.com, 1 page [Archived on web.archive.com on Dec. 23, 2007] [online] [Retrieved on Nov. 12, 2010] Retrieved from the Internet <URL:http://web.archive.org/web/20071223003722/http://www.opinmind.com/>.

Pang, B. et al, "A Sentimental Education: Sentiment Analysis Using Subjectivity Summarization Based on Minimum Cuts," ACL '04 Proceedings of the 42nd Annual Meeting on Association for Computational Linguistics, 2004, 8 pages, Dept. of Computer Science, Cornell University, Ithaca, NY.

Pang, B., "Automatic Analysis of Document Sentiment," A Dissertation Presented to the Faculty of the Graduate School of Cornell University in Partial Fulfillment of the Requirements for the Degree of Doctor of Philosophy, Aug. 2006, 135 Pages.

Pang, B., et al., *Thumbs up? Sentiment Classification using Machine Learning Techniques*, Proceedings of the 2002 Conference on Empirical Methods in Natural Language Processing, Jul. 6-7, 2002, pp. 79-86.

PCT International Search Report and Written Opinion, PCT/US2009/031901, Mar. 3, 2009, 8 Pages.

PCT International Search Report and Written Opinion, PCT/US2009/032061, Mar. 27, 2009, 9 Pages.

Popescu, A. et al., "OPINE: Mining Product Reviews," 1 page, [Archived on web.archive.com on Jan. 14, 2008] [online] [Retrieved on Nov. 12, 2010] Retrieved from the Internet <URL:http://web.archive.org/web/20080114065434/http://www.cs.washington.edu/research/knowitall/opine/>.

(56) References Cited

OTHER PUBLICATIONS

Popescu, A.-M., et al., *OPINE: Extracting Product Features and Opinions from Reviews*, Human Language Technology Conference and Conference on Empirical Methods in Natural Language Processing, Oct. 6-8, 2005, pp. 32-33.

Rottentomatoes.com, 1998, 2 pages, [Archived on web.archive.com on Dec. 5, 2007] [online] [Retrieved on Nov. 12, 2010] Retrieved from the Internet <URL:http://web.archive.org/web/20071205114734/http://www.rottentomatoes.com/>.

Snyder, B., et al., *Multiple Aspect Ranking using the Good Grief Algorithm*, Human Language Technologies 2007: The Conference of the North American Chapter of the Association for Computational Linguistics, Apr. 22-27, 2007, pp. 300-3007.

Tan, S., et al., "A Novel Scheme for Domain-transfer Problem in the context of Sentiment Analysis," Proceedings of the sixteenth ACM conference on Conference on information and knowledge management, 2007, pp. 979-982.

Tang, H., et al., "A survey on sentiment detection of reviews," Expert Systems with Applications, vol. 36, Issue 7, Sep. 2009, pp. 10760-10773.

Textmap.com, "The entity search engine," 1 page, 2007, [Archived on web.archive.com on Dec. 27, 2007] [online] [Retrieved on Nov. 12, 2010] Retrieved from the Internet <URL:http://web.archive.org/web/20071227081734/http://textmap.com/>.

Turney, P., *Thumps up or Thumbs down? Semantic Orientation Applied to Unsupervised Classification of Reviews*, Proceedings of the 40$^{th}$ Annual Meeting of the Association for Computational Linguistics (ACL), Jul. 2002, pp. 417-424.

Wiebe, J., *Learning Subjective Adjectives from Corpora*, Proceedings of the Seventeenth National Conference on Artificial Intelligence (AAAI-2000), 2000, pp. 735-740.

Zhuang, L., et al., *Movie Review Mining and Summarization*, ACM 15$^{th}$ Conference on Information and Knowledge Management, Nov. 6-11, 2006, pp. 43-50.

\* cited by examiner

SENTIMENT-BASED CLASSIFICATION OF MEDIA CONTENT

BACKGROUND

1. Field of the Invention

The present invention relates generally to browsing and searching videos and other media hosted at a website. In particular, embodiments of the present invention are directed toward providing browsing and searching of media based on sentiment expressed in comments associated with the media.

2. Background

Various media hosting websites provide methods for users to comment on the media content hosted by the websites. For example, news publications, blogging sites, video and audio content providers typically provide a "comment" option. A visitor to the site who wishes to comment on a story or other posted media content can generally select a "comment" or "feedback" link, and post textual comments for other visitors of the site to view.

User comments can indicate user opinion or sentiment about the media content. For example, users may provide comments expressing sentiment about the entertainment value and/or expressing sentiment about how informative, intelligent or accurate the media content is. The sentiment provided in the comments (e.g. how funny the media content is) may be viewed by other users of the media hosting website in order to determine whether the media content appeals to them. However, to assess the overall sentiment or opinion regarding particular media content a user must read all of the comments about it. Due to the large volume of comments posted by viewers, reading all comments associated with the media content may be time-consuming and make it difficult for a user to assess overall sentiment expressed therein. Accordingly, there is a need for a way to identify user sentiment expressed within comments associated with media content.

SUMMARY

Embodiments of the present invention enable the generation and use of sentiment scores associated with media content, wherein the sentiment scores indicate different types of sentiment expressed in comments associated with the items of media content. The media content may be video, audio, text, still images or other types of media content An embodiment of a method according to the present invention comprises a computer-implemented method for generating a sentiment profile for an item of media content. A set of comments associated with an item of media content is identified. A set of sentiment scores associated with the set of comments is generated, wherein each sentiment score indicates a type of sentiment expressed in a comment. The sentiment profile is generated responsive at least in part to the set of sentiment scores, the sentiment profile indicating the types of sentiment expressed in comments associated with the item of media content and stored in association with the item of media content.

Another embodiment of a method according to the present invention comprises a computer-implemented method. A search query searching for media content is received, the search query indicating a type of sentiment associated with the searched-for media content. A set of search results is received responsive at least in part to the search query, the search results identifying a set of items of media content having the type of sentiment indicated by the search query, items in the set of media content having associated sentiment scores indicating types of sentiment expressed in comments associated with the items of media content. The set of search results is provided.

Another embodiment of a method according to the present invention comprises a computer-implemented method. A selection of an item of media content is received. A plurality of items of media content based on a plurality of sentiment similarity scores is received, wherein each sentiment similarity score indicates a similarity between types of sentiment expressed in comments associated with the selected item of media content. The plurality of items of media content is provided.

Another embodiment of a method according to the present invention comprises a computer-implemented method for displaying an item of media content on a display device. A set of sub-portions of an item of media content is identified, wherein each sub-portion is associated with a sentiment score indicating a magnitude of a type of sentiment expressed in a comment associated with the sub-portion of the item of media content. The item of media content is displayed on a display device, wherein the set of sub-portions of the item of media content are displayed in association with the magnitudes of the type of sentiment indicated by the sentiment scores associated with the sub-portions of the item of media content.

The features and advantages described in this summary and the following detailed description are not all-inclusive. Many additional features and advantages will be apparent to one of ordinary skill in the art in view of the drawings, specification, and claims hereof.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
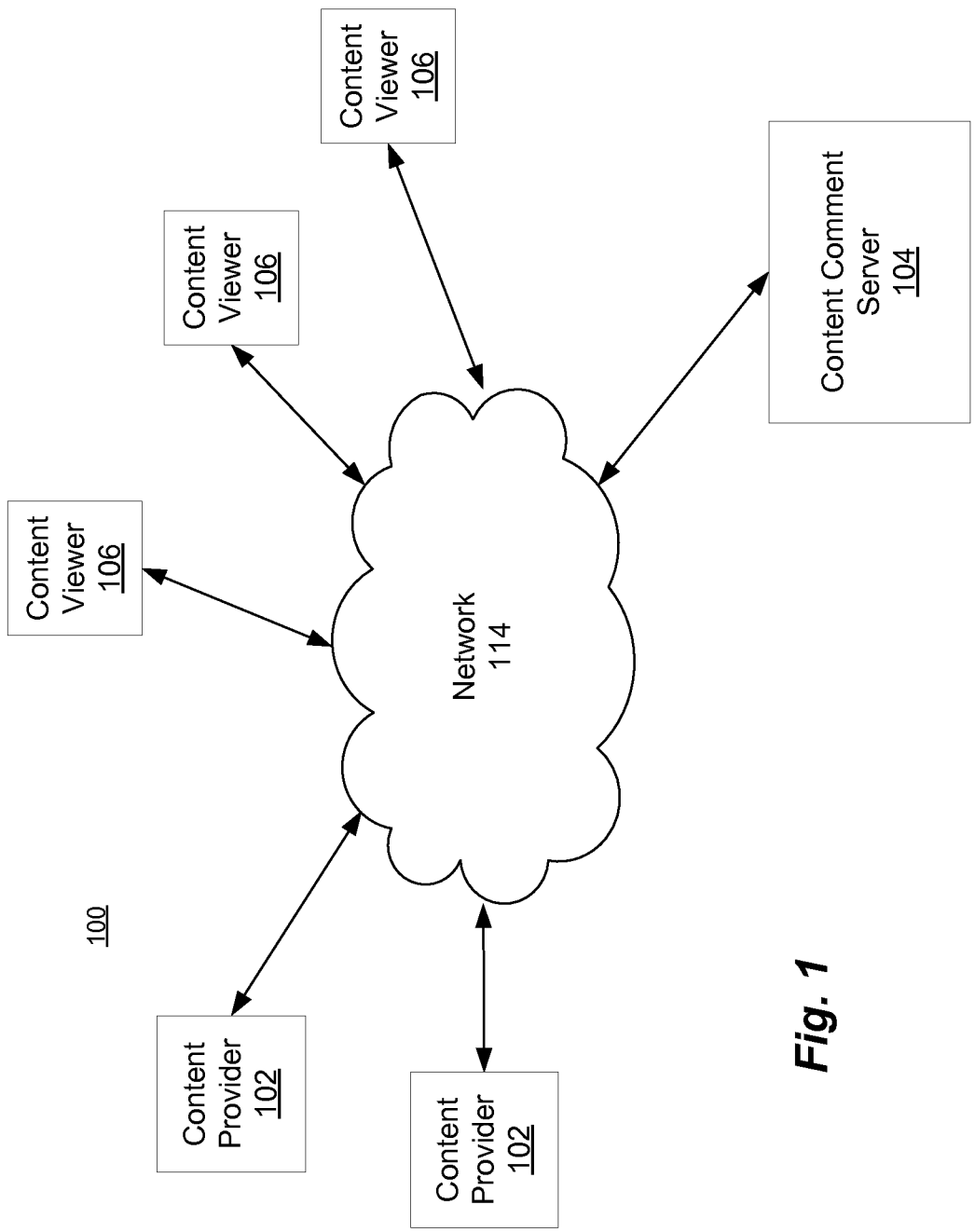
FIG. 1 is a high-level block diagram of a computing environment according to one embodiment.

FIG. 1 illustrates a content comment server 104, a plurality of content viewers 106 and plurality of content providers 102 connected by a network 114. Only two content providers 102 and three content viewers 106 are shown in FIG. 1 in order to simplify and clarify the description. Embodiments of the computing environment 100 can have thousands or millions of content providers 102 and content viewers 106 connected to the network 114.

The content comment server 104 communicates with content viewers 106 and content providers 102 over the network 114. The content comment server 104 receives uploaded media content from content providers 102 and allows content to be viewed by content viewers 106. Media content may be uploaded to the content comment server 104 via the Internet from a personal computer, through a cellular network from a telephone or PDA, or by other means for transferring data over the network 114. Media content may be downloaded from the content comment server 104 in a similar manner; in one embodiment media content is provided as a file download to a content viewer 106; in an alternative embodiment, media content is streamed to the content viewer. The means by which media content is received by the content comment server 104 need not match the means by which it is delivered to a content viewer 106. For example, a user of the content provider 102 may upload a video via a browser when the content provider is a personal computer, whereas a user of the content viewer 106 may view that video as a stream sent to a PDA, when the content viewer is a PDA. Note also that the content comment server 104 may itself serve as the content provider 102.

A content provider 102 provides media content to the content comment server 104. Examples of media content include audio, video, image and text content; other forms of content available for consumption may also be provided. The media content may have been created by a content provider 102, but need not have been.

Content viewers 106 view media content provided by the content comment server 104 via a user interface. Typically, a content viewer 106 runs a web browser such as Microsoft Internet Explorer or Mozilla Firefox, and the content comment server 104 includes a web server such as Microsoft Internet Information Services. Using her browser, a user of content viewer 106 browses and searches for content provided by the content comment server 104 and views content of interest, including video content. In some embodiments, the content viewer uses other types of software applications to view, browse and search media content from the content comment server 104. As described further below, the content viewer 106 also allows a user to provide comments to content comment server 104 in response to viewed media content.

The content comment server 104 further functions to generate sentiment profiles based on the received comments. Sentiment profiles are sets of scores indicating different types of sentiment expressed in comments associated with an item of media content such as a video, blog entry, new story or song. A type of sentiment, as used herein, refers to any aspect of the item of the media content which is subjectively evaluated. For example, the entertainment value of the media content is an aspect of the media content that is subjectively evaluated by viewers of media content and is inherently subject to differences in opinion. Typically, the different types of sentiment may be directed to aspects of the entertainment value of the media content such as how humorous, interesting, heartwarming or frightening the media content is. Depending on the embodiment, other types of sentiment may be directed to the information value of the media content such as: the accuracy of the media content, the intellectual value of the media content, or how controversial the media content is. Other types of sentiment are well known. The content viewer 106 may use these profiles to browse or search media content on the content comment server 104.

Figure 2:
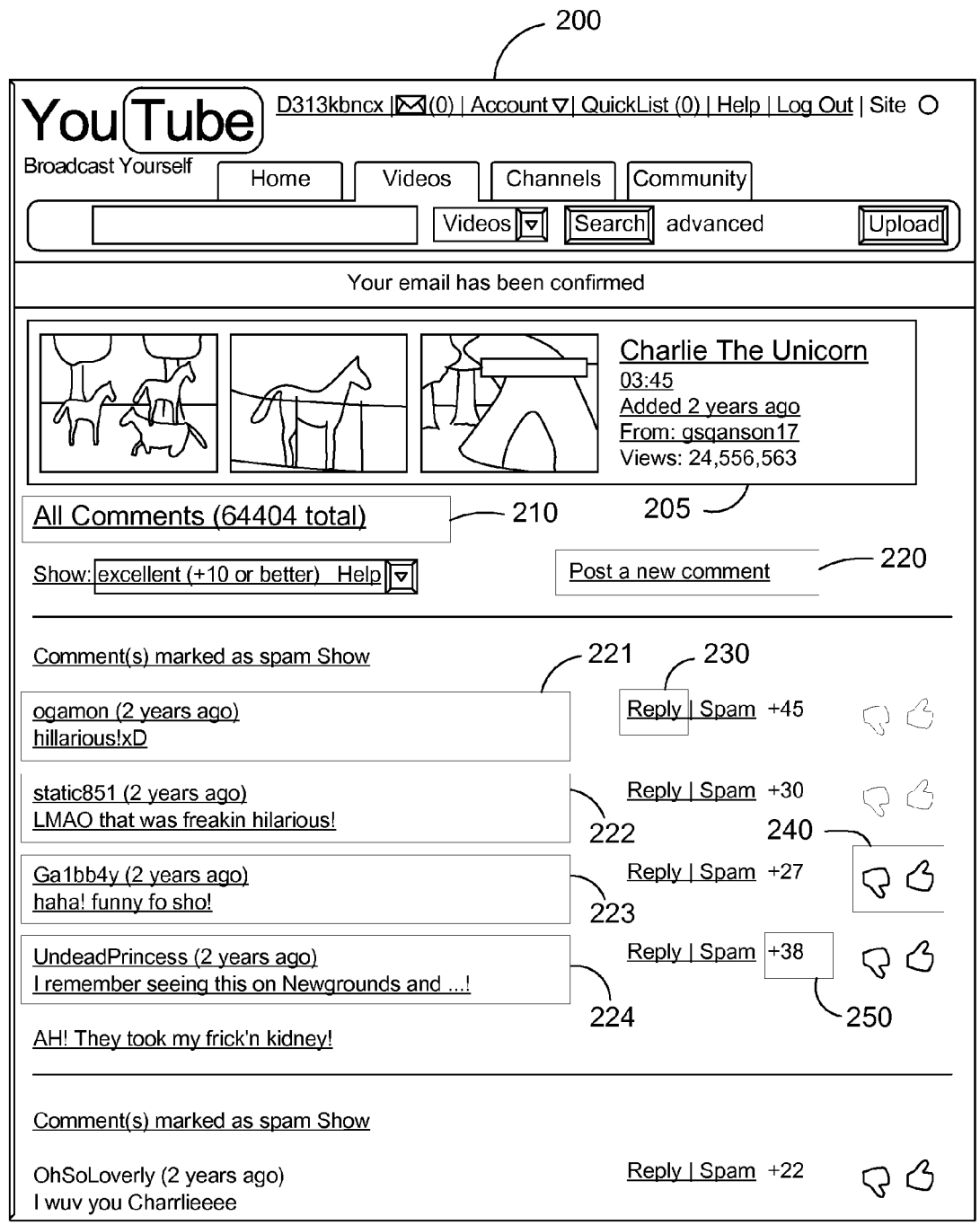
FIG. 2 is a screen shot illustrating a graphical user interface for providing a comment associated with an item of media content according to one embodiment.

FIG. 2 illustrates a user interface 200 for displaying media content on the content viewer 106 according to one embodiment. In the embodiment illustrated, the user interface 200 displays video content, comments, and information about the video content. In alternate embodiments, the user interface 200 may display other types of media content such as image content, textual content or audio content.

The user interface 200 displays an item of media content 205 and comments 221, 222, 223, 224 submitted by content viewers 106 expressing sentiment about the item of media content. The user interface 200 further displays the number of comments 210 associated with the item of media content submitted by content viewers 106. The user interface 200 further displays information associated with the media content 205 that can be used to uniquely identify the media content such as images associated with media content or the author of the media content.

The user interface 200 displays a comment posting user-interface object 220 that the content viewer 106 may select to post comments about the item of media content 205. In some embodiments, the comment posting user-interface object 220 allows the content viewer to post comments in association with a specific temporal and/or spatial sub-portion of the media content. The user interface 200 also displays comment thread user-interface objects 230 which allow the content viewer 106 to create threads of comments by responding to comments submitted by other users. A thread of comments, as used herein, refers to a sequential series of comments submitted in response to other comments. The first comment in the thread of comments is herein referred to as the parent comment. The content viewer 106 further displays agree/disagree user interface objects 240 which allow users to agree or disagree with the comments submitted by other users. The content viewer 106 also displays a value 250 representing the number of user agreements or disagreements associated with the user submitted comment.

Figure 3:
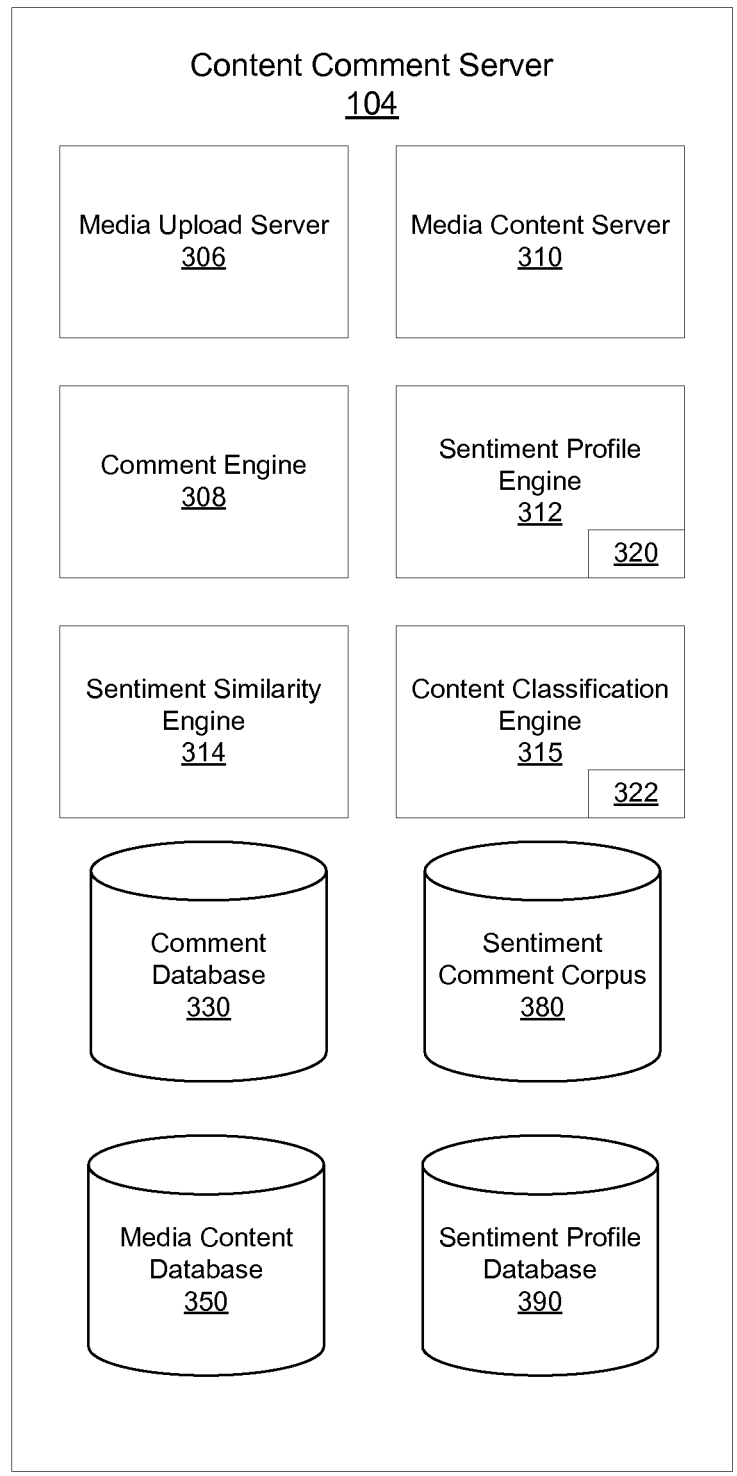
FIG. 3 is a high level block diagram of a content comment server according to one embodiment.

FIG. 3 is a high-level block diagram illustrating a detailed view of the content comment server 104 according to one embodiment. As shown in FIG. 3, the content comment server 104 includes several engines and servers. Those of skill in the art will recognize that other embodiments can have different engines and/or servers than the ones described here, and that the functionalities can be distributed among the engines and/ or servers in a different manner. In addition, the functions ascribed to the content comment server 104 can be performed by multiple servers.

In alternate embodiments of the comment content server 104, the media content database 330 and/or the media content server 310 may be hosted at one or more separate servers by different entities with the content comment server 104 acting as a third party server to process comments received by the media upload server 306 and generate sentiment profiles for the processed comments.

The media upload server 306 receives media content uploaded by the content providers 102. The media content server 306 stores uploaded media content in the media content database 330. The media upload server 306 further receives uploaded comments about the media content and other information such as ratings associated with the media content from the content viewers 106. The media upload server 306 stores the uploaded comments in the comment database 350.

The media content database 350 stores received media content in association with unique identifiers for that media content. According to the embodiment, the media content database 350 may store additional information about the media content such as an author of the media content, the date the media content was received by the content comment sever 104, the subject of the media content, categories associated with the media content, tags associated with the media content and comments provided by an author of the media content. In some embodiments, the media content database 350 stores information derived from providing the media content to content viewers 106 such as ratings of the media content provided by the content viewers 106 and the frequency at which the media content is viewed by the content viewers 106.

The media content server 310 provides information and media content to the content viewers 106. The media content server 310 retrieves media content from the media content database 330. The media content server 310 provides the retrieved media content to the content viewers 106. The media content server 310 also retrieves comments from the comment database 350 and provides these comments to the content viewers 106. The media content server 310 further functions to retrieve and provide information and media content responsive to search queries received from the content viewers 106. The search queries may include criteria including the type of sentiment, search terms, etc. The media content server 310 retrieves items of media content associated with sentiment profiles indicating types of sentiment identified by the content viewer 106 and provides these items of media content to the content viewer 106. The media content server 310 further retrieves items of media content related to a selected item of media based on sentiment similarity scores indicating a high similarity between sentiment profiles for the retrieved and selected items of media content and provides the retrieved items of media content to the content viewers 106. The media content server 310 further retrieves individual sentiment scores associated with sub-portions of items of media content and provides the individual sentiment scores to the content viewers 106 for display association with the items of media content.

The comment engine 308 processes comments for storage in the comment database 350 and the sentiment comment corpus 380. The comment engine 308 communicates with the media upload server 306 to receive uploaded comments associated with media content. The comment engine 308 also identifies comments in the sentiment comment corpus 380 that require processing. The comment engine 308 processes comments using a defined set of algorithms and transforms.

If the comment engine 308 identifies comments provided in non-textual media, such as audio, video or image content, the comment engine 308 generates textual comments from the received comments using techniques such as speech recognition and optical character recognition (OCR).

The comment engine 308 further generates natural language information about the textual comments by processing the textual comments using natural language processing (NLP) techniques. The comment engine 308 stores the natural language information in association with the comment from which it was generated and the item of media content in the comment database 250. According to the embodiment, natural language information generated by the comment engine 308 may include tokens, part-of-speech tagged tokens, stemmed tokens, n-grams and phrases (e.g. noun phrases, verb phrases). According to the embodiment, natural language processing techniques and algorithms used by the comment engine 308 may include: parsing or tokenizing, punctuation extraction, stemming, negation detection, part-of-speech tagging, and use of regular expressions to identify pre-defined data.

In a one embodiment, the comment engine 308 parses the textual comments into sets of tokens and generates part-of-speech (POS) tags for the tokens using a probabilistic tagger and the following notation:

Q is used to denote tokens representing Punctuation or Phrase-Breaking Markers.
P is used to denote tokens representing Pronouns other than "you".
Y is used to denote tokens representing the Pronoun "you".
M is used to denote tokens representing Modal Verbs (e.g., 'can').
A is used to denote tokens representing Adjectives.
R is used to denote tokens representing Adverbs.
N is used to denote tokens representing Nouns.
V is used to denote tokens representing Verbs.
O is used to denote tokens representing parts-of-speech that are other than the above listed parts-of-speech or unknown.

In one embodiment, the comment engine 308 selects sentiment-laden phrases based on the tagged tokens and stores the sentiment-laden phrases in the comment database 350. According to the embodiment, sentiment-laden phrases may be selected using regular expressions or parsing techniques such as syntax trees or semantic grammars. In some embodiments, sentiment-laden phrases may be identified using a pre-defined lexicon of sentiment-laden phrases. In a specific embodiment, the comment engine 308 uses the following regular expressions to select sentiment-laden phrases:

1. Adjective+Noun: "(.*?)(A+N+)( )" (e.g. funny video)
2. Adverb+Adjective+Noun: "(.*?)(R+A+N+)( )" (e.g. really funny video)
3. Model Verb+Verb+Adjective+Noun: "(.*?)(MV ?A+N+) ( )" (e.g. can make a funny video)
4. Pronoun+Verb+Adverb (optional)+Adjective+Noun: "(.*?)(PV ?R*A+N+)( )" (e.g. I love this really funny video)
5. Punctuation+Verb+Adverb (optional)+Adjective+Noun, if preceded by punctuation: "(^|.*?Q)(V+?R*A+N+)( )" (e.g. Love the funny video)
6. Noun/Pronoun+Verb+Adverb (optional)+Adjective: "(.*?) ((?:N+|P)+V+R*A+)(Q|$)" (e.g. this video is really funny)

In another embodiment, the comment engine 308 parses the comments into sets of tokens and combines the tokens into n-grams. N-grams are sets of tokens that are consecutive in the comments. In one embodiment, the comment engine 308 uses a sliding window technique to generate the n-grams.

Using a sliding window technique, a window of n tokens (e.g. 3, 4, 5, or 6 tokens) is advanced by one token over the set of tokens representing the comment in order to produce a set of all n-grams in the comment. The comment engine 308 stores the n-grams in the comment database 330 in association with the comments.

The comment engine 308 further identifies colloquial sentiment information in the comments. Colloquial sentiment information is information that contains sentiment but is different in structure than written language. Therefore, most natural language processing algorithms cannot be applied to colloquial sentiment information. The comment engine 308 can identify colloquial sentiment information specified in a pre-defined library of colloquial sentiment information using simple searches of the comments or by applying regular expressions to the comments. Colloquial sentiment information includes but is not limited to: acronyms, slang and emoticons. In most embodiments, colloquial sentiment information identified in comments is specific to the Internet such as acronyms, slang or emoticons commonly used in communications on Internet websites (e.g. OMG, ☻, ☺, LOL). Colloquial sentiment information is stored in association with the comments in which it is identified.

The comment database 330 stores comments received from the content viewers 106 regarding the media content. The comment database 330 stores the comments in association with unique identifiers for the media content. The comment databases 330 further stores information generated by the comment engine 308 such as textual comments derived from non-textual comments such as video or audio comments in association with the unique identifier for the comment. The comment database 330 further stores natural language information generated by the comment engine 308. The comment database 330 further stores colloquial sentiment information identified by the comment engine 308 in association with unique identifiers for the comments.

According to the embodiment, the comment database 350 also may store annotation information which indicates a sub-portion of the media content that the comment is associated with. In one embodiment, annotation information indicates that a comment is associated with a temporal sub-portion (i.e. subset of time points) of an item of time-series media such a video or a song (e.g. a comment associated with a chorus of a song). In another embodiment, annotation information indicates a spatial sub-portion of media such as a video or image that the comment is directed to (e.g. a comment associated with a person in an image). In another embodiment, annotation information may indicate that the comment is associated with a sub-portion of text in textual media such as a book, website or a blog (e.g. a paragraph in a news story).

In some embodiments, the comment database 330 stores information regarding threads of comments. In these embodiments, the comment database 330 stores information indicating a parent comment and the sequential order of comments in the thread. In some embodiments, each thread may further be associated with sub-threads. The comment database 330 further stores information indicating the number of comments in each thread and the number of threads associated with an item of media content.

The sentiment comment corpus 380 stores comments about media content in association with labels indicating the types of sentiment expressed in the comments (e.g. sad, happy, inspiring. etc.). In some embodiments, the labels may further indicate the strength or magnitude of the types of sentiment expressed in the comments (e.g. very funny). In a specific embodiment, strength or magnitude may be represented as a continuous score (e.g. a level of funny from 1 to 5).

According to the embodiment, the labels may be generated by an administrator or computationally through classification of comments stored in the comment database 350.

The sentiment comment corpus 380 further stores natural language information and colloquial sentiment information generated by the comment engine 308, as described above. According to the embodiment, the sentiment comment corpus 380 may associate labels indicating the type and magnitude of sentiment expressed in the comments with comments in their entirety or associate labels indicating the type and magnitude of sentiment expressed in the comments with information derived from the comments such as natural language information such as sentiment-laden phrases or colloquial sentiment information. In other embodiments, comments may be processed by the comment engine 308 before they are labeled with types of sentiment and magnitude values and stored in the sentiment comment corpus 380.

In one embodiment, the sentiment comment corpus 380 associates labels indicating type and magnitude of sentiment with comments and/or natural language information based on a lexical database, such as the WordNet electronic lexical database available from Princeton University of Princeton, N.J. The lexical database describes mappings between related words. That is, the database describes synonym, antonym, and other types of relationships among the words. In one embodiment, an administrator of the content comment server 104 selects initial labels for comments and/or natural language information in the sentiment comment corpus 280 by reviewing the lexical database and manually selecting and scoring words expressing different types of sentiment. For example, a comment containing a token for the word "hilarious" could be labeled with the sentiment type "humorous" at a magnitude of 5 on a scale of 5. This initial set of words is expanded through an automated process to include synonyms (e.g. "funny", "droll") and antonyms referenced in the lexical database. The expanded set of words is then used either automatically or manually to assign labels and scores to comments and natural language information associated with the comments in the sentiment comment corpus 280. In an alternate embodiment, the lexical database may be generated automatically or semi-automatically by training or re-training classifiers on the sentiment comment corpus 280. In a specific embodiment, the sentiment comment corpus 280 is updated to include comments labeled by the sentiment profile engine 312 and the lexical database is re-generated based in part on the updated sentiment comment corpus 280.

The sentiment comment corpus 380 further stores a library of colloquial sentiment information in association with labels indicating the type of sentiment that it is intended to express. For instance, the emoticon "☺" may be associated with the sentiment type "happy" with a magnitude of "5". Likewise, the acronym "LOL" may be associated with the sentiment type "humorous" with a magnitude of "4". This library of colloquial sentiment information is used to automatically determine labels indicating the type of sentiment expressed in the comments for colloquial sentiment information stored in the sentiment comment corpus 380.

The sentiment comment corpus 380 may further store information indicating the type of media represented in the media content to which the comment is directed (e.g. news story, video, movie, blog, song, etc.).

The sentiment profile engine 312 generates sentiment profiles for the items of media content based on the comments associated with the items of media content. The sentiment profile engine 312 generates individual sentiment scores for the comments by classifying natural language information and colloquial sentiment information associated with each of the stored comments using one or more sentiment classifiers 320. Each individual sentiment score represents the likelihood that a type of sentiment is expressed in a comment associated with an item of media content. The sentiment profile engine 312 then aggregates individual sentiment scores for all comments associated with an item of media content indicating a type of sentiment and stores the aggregate sentiment scores in sentiment profiles associated with the item of media content. The sentiment profiles contain a set of aggregate scores which represent different types of sentiment expressed in comments associated with media content. Different types of sentiment expressed in the comments include but are not limited to: how humorous, heartwarming, cheerful, inspirational, informative, accurate, strange, sad, shocking, frightening, entertaining or intelligent the media content is.

The sentiment profile engine 312 generates the sentiment classifiers 320 based on the sentiment comment corpus 380. The sentiment profile engine 312 identifies labeled natural language information and colloquial sentiment information in the sentiment comment corpus 380. The sentiment profile engine 312 then generates a different sentiment classifier 320 for each type of sentiment by selecting any combination of the natural language information and colloquial sentiment information associated with the label indicating the type of sentiment. For example, the sentiment profile engine 312 may generate a sentiment classifier 320 for the sentiment type "frightening" based on any combination of the colloquial sentiment information and natural language information in the sentiment comment corpus 380 associated with a label indicating the sentiment type "frightening" (e.g. the sentiment laden phrase "very scary movie" and/or the emoticon ":O"). The sentiment classifier 320 is a statistical model which specifies a set of values, such as a set of co-efficient values, in association with the natural language information and/or colloquial sentiment information. The set of values specifies the correlation between natural language information and/or colloquial sentiment information and the label indicating the type of sentiment.

According to the embodiment, the sentiment profile engine 312 can generate the classifier for a sentiment type using any type of classification model 320. Suitable classification models include but are not limited to: decision tree models, regression-based models, Bayesian models, support vector machines (SVMs) and neural network models.

In some embodiments, the sentiment profile engine 312 may generate a sentiment classifier 320 for a type of sentiment based on a set of comments, colloquial sentiment information or natural language information that are not associated with a label indicating the type of sentiment. The inclusion of the set of comments, colloquial sentiment information or natural language information that is not associated with a label indicating the type of sentiment provides a set of negative examples used to train a binary classifier to identify information associated with comments that do not indicate the type of sentiment. For example, the sentiment profile engine 312 may generate a sentiment classifier 320 for the sentiment type "frightening" based on any combination of the comments, colloquial sentiment information and natural language information in the sentiment comment corpus 380 that are associated with a label indicating the sentiment type "happy".

The sentiment profile engine 312 applies the generated classifiers to comments in the comment database 330 to generate a set of individual sentiment scores for each comment. The individual sentiment scores represent the likelihood that the comment expresses particular types of sentiment. Typically, the individual sentiment scores are continuous scores. In some embodiments the individual sentiment scores are subject to threshold values in order to assign binary scores or labels indicating whether or not the comment expresses the sentiment type. In these embodiments, the individual sentiment scores are represented as binary scores in association with the label. In some embodiments, the individual sentiment scores are discretized or normalized. Individual sentiment scores are stored in association with the comments in the comment database 330. According to the embodiment, comments associated with individual sentiment scores strongly indicating that the comment expresses a sentiment type may be labeled with the sentiment type and stored in the sentiment comment corpus 380.

The sentiment profile engine 312 aggregates the individual sentiment scores associated with comments expressing sentiment about an item of media content to generate aggregate sentiment scores representing the sentiment expressed in the comments. According to the embodiment, the sentiment profile engine 312 can aggregate the individual sentiment scores by averaging the individual sentiment scores, selecting a top percentile of individual sentiment scores or by using consensus methods. According to the embodiment, the aggregate sentiment scores may be binary scores, indicating whether or not types of sentiment are expressed in the majority of comments associated with an item of media content. In other embodiments, the aggregate sentiment scores may be continuous scores indicating likelihoods that types of sentiment are expressed in the comments associated with an item of media content or magnitude scores indicating strengths at which the types of sentiment are expressed in the comments associated with an item of media content.

In some embodiments, the sentiment profile engine 312 weights the individual sentiment scores before generating the aggregate sentiment scores. In one embodiment, the sentiment profile engine 312 weights the individual sentiment scores based on historic information associated with the user who provided the comment associated with the sentiment score. The historic information associated with the user may include ratings information or sentiment scores associated with other comments provided by the user. For instance, a high sentiment score for the sentiment type "cute" associated with a comment provided by a user who frequently submits comments with sentiment scores indicating "cute", may be given a reduced weight. Conversely, a high sentiment score for a sentiment type "entertaining," associated with a comment provided by a user who frequently gives media content poor ratings may be given an increased weight.

In one embodiment, the sentiment profile engine 312 weights the individual sentiment scores for a comment based on the number of agreements or disagreements submitted by content viewers 106 regarding the comment before aggregating the individual sentiment scores. For instance, a comment with 300 agreements would have a greater weight than a comment with 5 disagreements. In other embodiments, individual sentiment scores associated with comments that are parent comments in a thread of comments may be weighted by the number of other comments in the thread of comments. For instance, a comment with 300 replies may be deemed more interesting or controversial than a comment with no replies and be given a greater weight in determining the aggregate sentiment scores. Similarly, comments may be weighted by the order in which they appear in the thread. Comments which are closer to the parent comment may be given a greater weight than comments that occur later in the sequence specified by the thread.

In embodiments where comments are associated with sub-portions of items of media content, individual sentiment scores may be weighted by the proportion of the media the comments are associated with. For instance, an individual sentiment score associated with a 5 second long portion of a 10 minute long video would be given a lower weight in determining an aggregate sentiment score for the video than a comment associated with 5 minute long portion of the video.

The sentiment profile engine 312 stores the aggregate sentiment scores as sentiment profiles in association with the unique identifiers for the items of media content in the sentiment profile database 390. The sentiment profile database 390 stores the set of aggregate sentiment scores in association with the type of sentiment the score represents as sentiment profiles. In instances where there is only a single comment associated with an item of media content, the sentiment profile engine 312 stores the individual sentiment scores for the comment as the sentiment profile in association with the item of media content in the sentiment profile database 390.

The sentiment profile database 390 stores a sentiment profile for each item of media content in association with a unique identifier for the item of media content. Each sentiment profile contains one or more aggregate sentiment scores and each aggregate sentiment score represents a different type of sentiment expressed in comments associated with the media content. According to the embodiment, the sentiment scores may be binary scores indicating whether a type of sentiment is expressed in comments associated with the media content or may be a continuous scores indicating a degree or level of a type of sentiment expressed in the comments associated with the media content. For example, sentiment scores of 1 or 0 may respectively indicate whether or not the comments associated with a video express the sentiment that the video is funny. In embodiments where the aggregate sentiment scores are binary, the sentiment profile store a series of binary scores in association with types of sentiment. For example, ({scary, 1}, {boring, 0}, {informative, 0}, {cute, 0}, {dramatic, 1}, {heartwarming, 0}, {wacky, 1}, {controversial, 1}).

According to the embodiment, continuous aggregate sentiment scores may either indicate the likelihood that a type of sentiment is expressed in comments or a strength at which a type of sentiment is expressed in comments. For example, a sentiment score of 90% for the sentiment type "informative" may indicate that the likelihood of an item of media content being "informative" based on the comments is 90%. Alternatively, a sentiment score of 5 for the sentiment type "happy" could indicate that the sentiment type happy has a strength of 5 based on the comments associated with the item of media content. In embodiments where the aggregate sentiment scores are continuous, the sentiment profile stores a series of continuous scores in association with types of sentiment. For example, ({scary, 8}, {boring, -2}, {informative, 0}, {cute, 0}, {dramatic, 6}, {heartwarming, -8}, {wacky, 5}, {controversial, 6}).

The sentiment similarity engine 314 generates sentiment similarity scores which indicate the correspondence between sentiment profiles associated with different items of media content. For each pair of sentiment profiles, the sentiment similarity engine 314 generates a sentiment similarity score based on the set of aggregate sentiment scores stored in the sentiment profiles. The sentiment similarity engine 314 generates a series of distance scores representing the correspondence between aggregate sentiment scores representing each sentiment type in the sentiment profiles. The sentiment similarity engine 314 combines the distance scores to generate a sentiment similarity score. According to the embodiment, the sentiment similarity engine 314 may generate and combine the distance scores to generate sentiment similarity scores using any suitable type of algorithm used to generate distance metrics such as Euclidean distance algorithms or Pearson correlation coefficient algorithms. The sentiment similarity engine 314 stores the sentiment similarity scores in association with the unique identifiers for the items of media content in the sentiment profile database 390. In alternate embodiments, the sentiment similarity engine 314 does not generate pair-wise similarity scores but instead uses a greedy algorithm to identify a subset of the sentiment profiles with highest similarity scores with each sentiment profile.

The content classification engine 315 generates content classifiers 322 based on the sub-portions of media content associated with individual sentiment scores indicating the same type of sentiment. For instance, the content classification engine 315 may generate a content classifier 322 based on sub-portions of media content associated with individual sentiment scores indicating that the sub-portions of the media content are "boring". According to the embodiment, the content classification engine 315 may select all sub-portions of media content associated with individual sentiment scores or only a set of sub-portions of media content with individual sentiment scores above a threshold value. For example, to generate a content classification 322 for the sentiment type "funny", the content classifier engine 315 may select only sub-portions of media content with individual sentiment scores for "funny" that are greater or equal to 4 on a scale of 1-5.

The content classification engine 315 generates features from sub-portions of media content that can be used to classify media content. Features are data that can be used to characterize the media content. The generated features correspond to the media type of the media content. For still image content, features extracted may include: pixel intensity, luminosity, data derived from shape detection algorithms and other data derived from still images. For audio content, features extracted may include: pitch, tone, mel-frequency cepstral coefficients (MFC), and other data derived from audio content. For video content, features may include data derived from shot detection algorithms, face detection algorithms, edge detection algorithms, and other data derived from video content.

The content classification engine 315 generates a content classifier 322 for each type of sentiment based on the extracted features from the sub-portions of media content associated with individual sentiment scores indicating the sentiment type. According to the embodiment, the content classifier 322 may be any type of statistical model that specifies a correspondence between a feature from an item of media content and a type of sentiment. Suitable statistical models for use as content classifiers include but are not limited to support vector machines (SVMs), neural networks, Bayesian models and logistic regression models.

According to the embodiment, the content classifier engine 315 may apply the content classifier 322 to the received media content in the media content database 330 to generate content sentiment scores indicating the likelihood that an item of media content is associated with a type of sentiment. In some embodiments, the content sentiment scores for an item of media content may be stored in the sentiment profile database in association with the sentiment profiles for the item of media content.

According to the embodiment, the content sentiment scores may be used to cross-validate or supplement the aggregate sentiment scores stored in the sentiment profile. In one embodiment, a content sentiment score showing a high likelihood of a type of sentiment based on features extracted from the item of media content may be used to cross-validate an aggregate sentiment score based on comments associated with the item of media content and vice-versa. For instance, a content sentiment score indicating a high likelihood that a video is dramatic may be used to validate an aggregate sentiment score indicating the same. In some embodiments, a content sentiment score showing a high likelihood of a type of sentiment based on features extracted from the item of media content may be further used to supplement or strengthen an aggregate sentiment score based on comments associated with the item of media content. For instance, a good agreement between a content sentiment score and an aggregate sentiment score for an item of media content could increase the content sentiment score for the item of media content.

Figure 4:
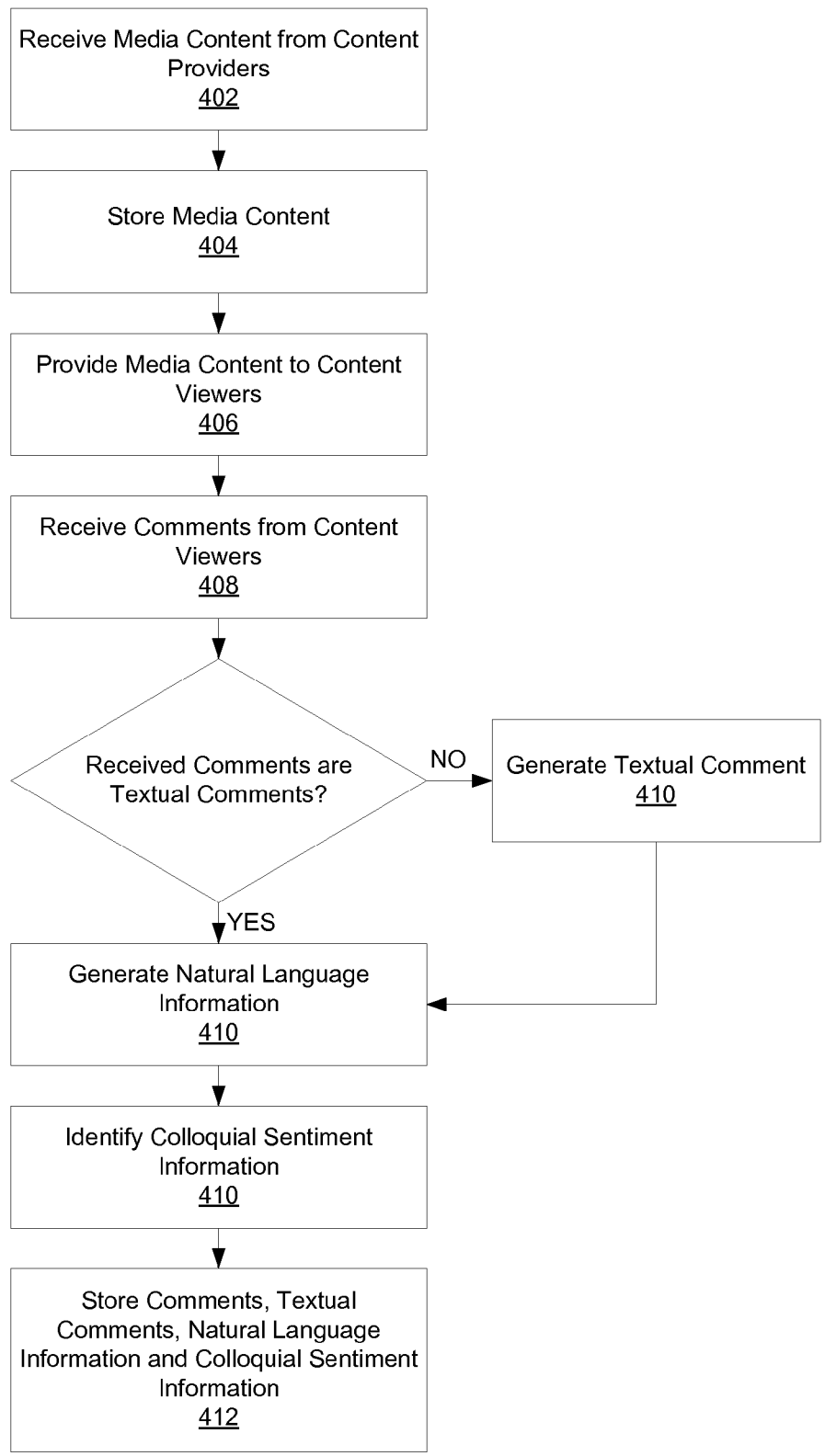
FIG. 4 is a flow chart illustrating steps performed by a content comment server to process and store comments associated with media content according to one embodiment.

FIG. 4 is a flowchart illustrating steps performed by the content comment server 104 to generate sentiment profiles in accordance with an embodiment of the present invention. Other embodiments perform the illustrated steps in different orders, and/or perform different or additional steps. Moreover, some of the steps can be performed by engines or modules other than the content comment server 104.

The content comment server 104 receives 402 the media content from the content providers 102. The content comment server 104 stores 404 the media content. The content comment server 104 provides 406 the media content to the content viewers 106. The content comment server 104 receives 408 comments from users of the content viewers 106. If the received comments are not textual comments, the content comment server 104 generates 410 textual comments based on the received comments. The content comment server 104 generates 412 natural language information based on the received comments. The content comment server 104 identifies 414 colloquial sentiment information based on the received comments. The content comment server 104 stores 416 the comments in association with the textual comments, natural language information and colloquial sentiment information in the comment database 330.

Figure 5:
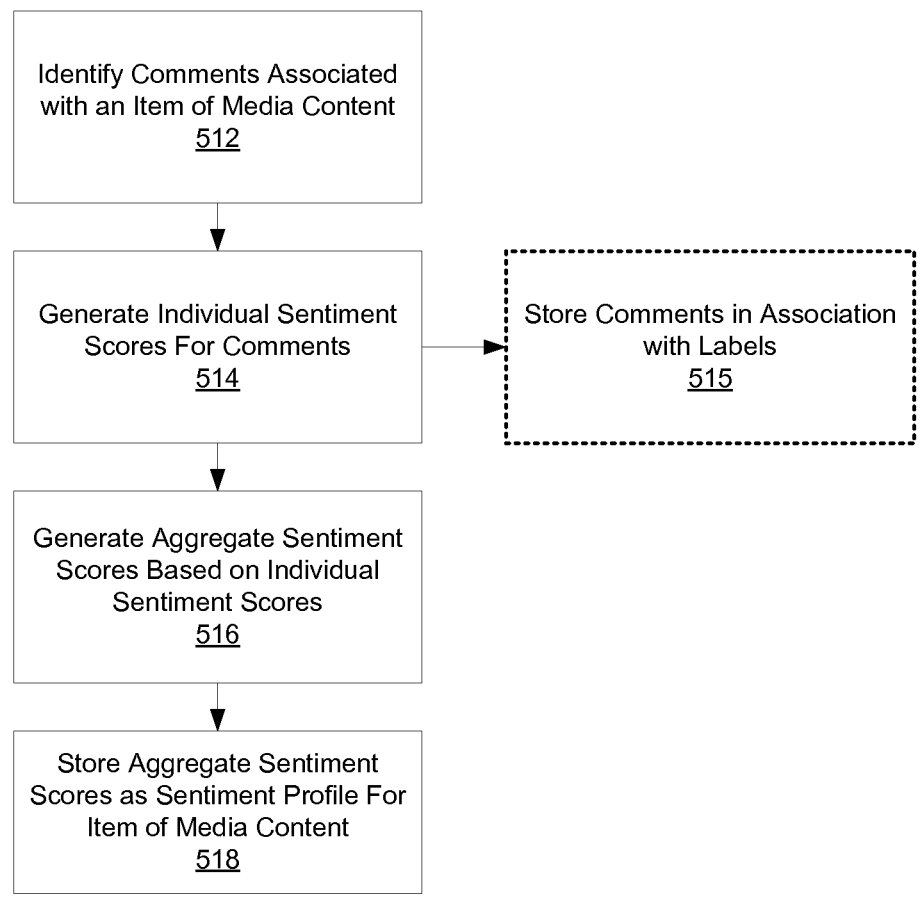
FIG. 5 is a flow chart illustrating steps performed by a content comment server to generate and store sentiment profiles associated with an item of media content according to one embodiment.

FIG. 5 is a flowchart illustrating steps performed by the content comment server 104 to generate sentiment profiles for an item of media content in accordance with an embodiment of the present invention. Other embodiments perform the illustrated steps in different orders, and/or perform different or additional steps. Moreover, some of the steps can be performed by engines or modules other than the content comment server 104.

The content comment server 104 identifies 512 comments associated with an item of media content in the comment database 350. The content comment server 104 applies one or more sentiment classifiers 320 to the natural language information and colloquial sentiment information associated with each comment to generate 514 individual sentiment scores, each individual sentiment score indicating whether the comment expresses a type of sentiment. In some embodiments, the content comment server 104 stores 515 comments with an individual sentiment score indicating a high likelihood that the comment expresses a type of sentiment in association with a label for the type of sentiment in the sentiment comment corpus 380. The content comment server 104 aggregates the individual sentiment scores indicating the same type of sentiment to generate 516 a set of aggregate sentiment scores. The content comment server 104 stores the set of aggregate sentiment scores representing the different sentiment types as a sentiment profile in the sentiment profile database.

Figure 6:
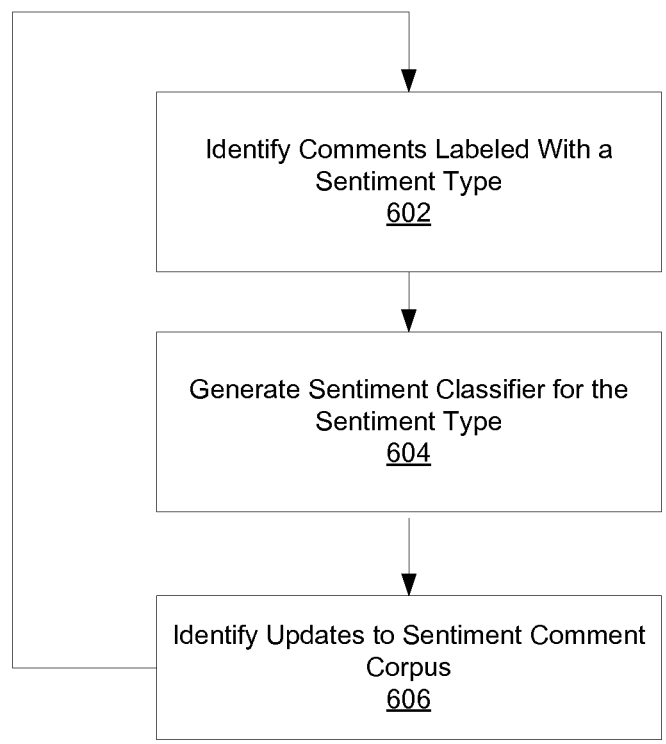
FIG. 6 is a flow chart illustrating steps performed by a content comment server to iteratively generate a sentiment classifier according to one embodiment.

FIG. 6 is a flowchart illustrating steps performed by the content comment server 104 to iteratively generate sentiment classifiers 320 in accordance with an embodiment of the present invention. Other embodiments perform the illustrated steps in different orders, and/or perform different or additional steps. Moreover, some of the steps can be performed by engines or modules other than the content comment server 104.

The content comment server 104 identifies 602 all comments labeled with a particular type of sentiment in the sentiment comment corpus 380. The content comment server 104 generates 604 a sentiment classifier 320 based on the colloquial sentiment information and the natural language information associated with the labeled comments. Upon identifying 606 updates to the sentiment comment corpus, the content comment server 104 iteratively identifies the newly labeled comments and re-generates the sentiment classifier 320.

Figure 7:
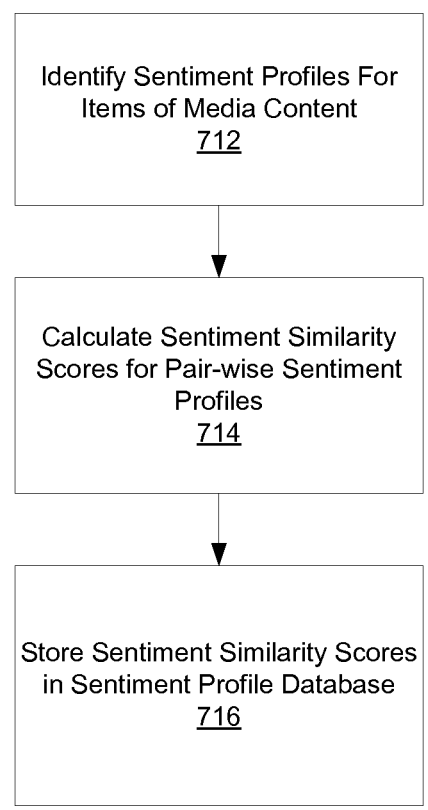
FIG. 7 is a flow chart illustrating steps performed by a content comment server to calculate sentiment similarity scores according to one embodiment.

FIG. 7 is a flowchart illustrating steps performed by the content comment server 104 to calculate sentiment similarity scores between sentiment profiles. Other embodiments perform the illustrated steps in different orders, and/or perform different or additional steps. Moreover, some of the steps can be performed by engines or modules other than the content comment server 104.

The content comment server 104 identifies sentiment profiles associated with items of media content. The content comment server 104 calculates sentiment similarity scores between each pair of items of media content based on their associated sentiment profiles. The content comment server 104 stores the sentiment similarity scores in the sentiment profile database 390.

Figure 8:
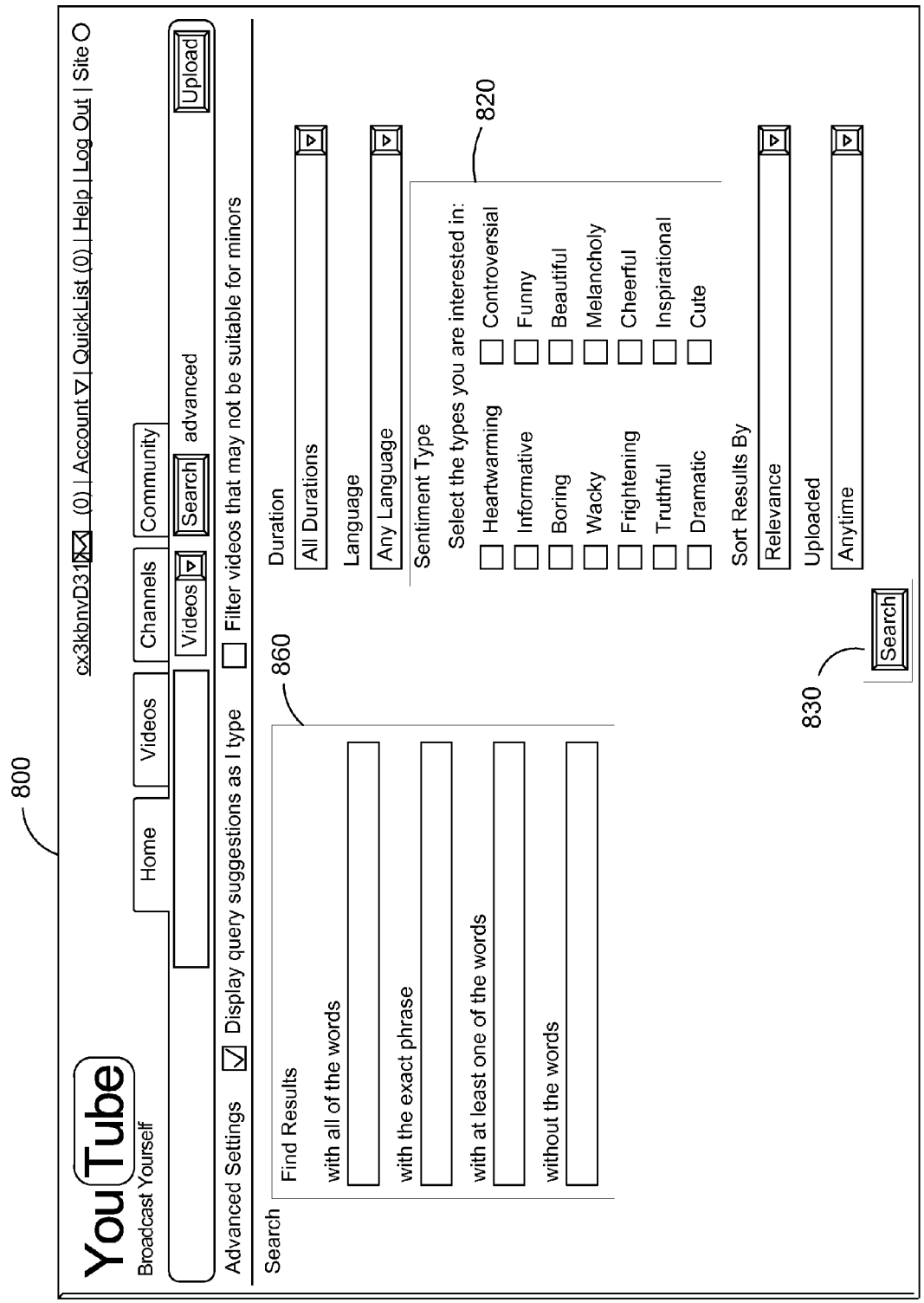
FIG. 8 illustrates a graphical user interface for searching media content according to types of sentiment expressed in comments associated with the media content according to one embodiment.

FIG. 8 is a screenshot illustrating a user interface 800 for searching media content on the content viewer 106. In the user interface 800 illustrated, the media content is video content. In other embodiments, the media content may be audio content, textual content or image content.

The illustrated user interface 800 provides several search fields the content viewer uses to query the media content stored on the content comment server 104. These fields include fields 860 which allow the user to provide search terms used to search textual information associated with the media content such as titles of the media content or a summaries of the media content. Graphical user interface elements 820 are provided which allow the user to refine search results by selecting from several different sentiment types. In the embodiment illustrated, the user may select different sentiment types using check boxes 820. The user submits a query including the search terms and/or selected sentiment types using a search button 830. In other embodiments, the user may further provide other search criteria such as a selection to retrieve the most frequently viewed media content, the highest rated media content, or the media content most recently submitted to the media content database 350.

Upon submission, the query is transmitted to the comment content server 104. The media content server 310 receives the query. The media content server 310 identifies unique identifiers for a set of items of media content associated with aggregate sentiment scores indicating a high likelihood that the comments associated with the media content express the selected sentiment types from the sentiment profile database 390. The media content server 310 then retrieves the set of items of media content indicated by the unique identifiers from the media content database 350 and provides the retrieved set of items of media content to the content viewer 104 as a set of search results. If search terms and/or other criteria are provide by the user, the media content server 310 filters the set of items according to search terms and/or other criteria provided by the user and provides a filtered set of items to the content viewer 104.

Figure 9:
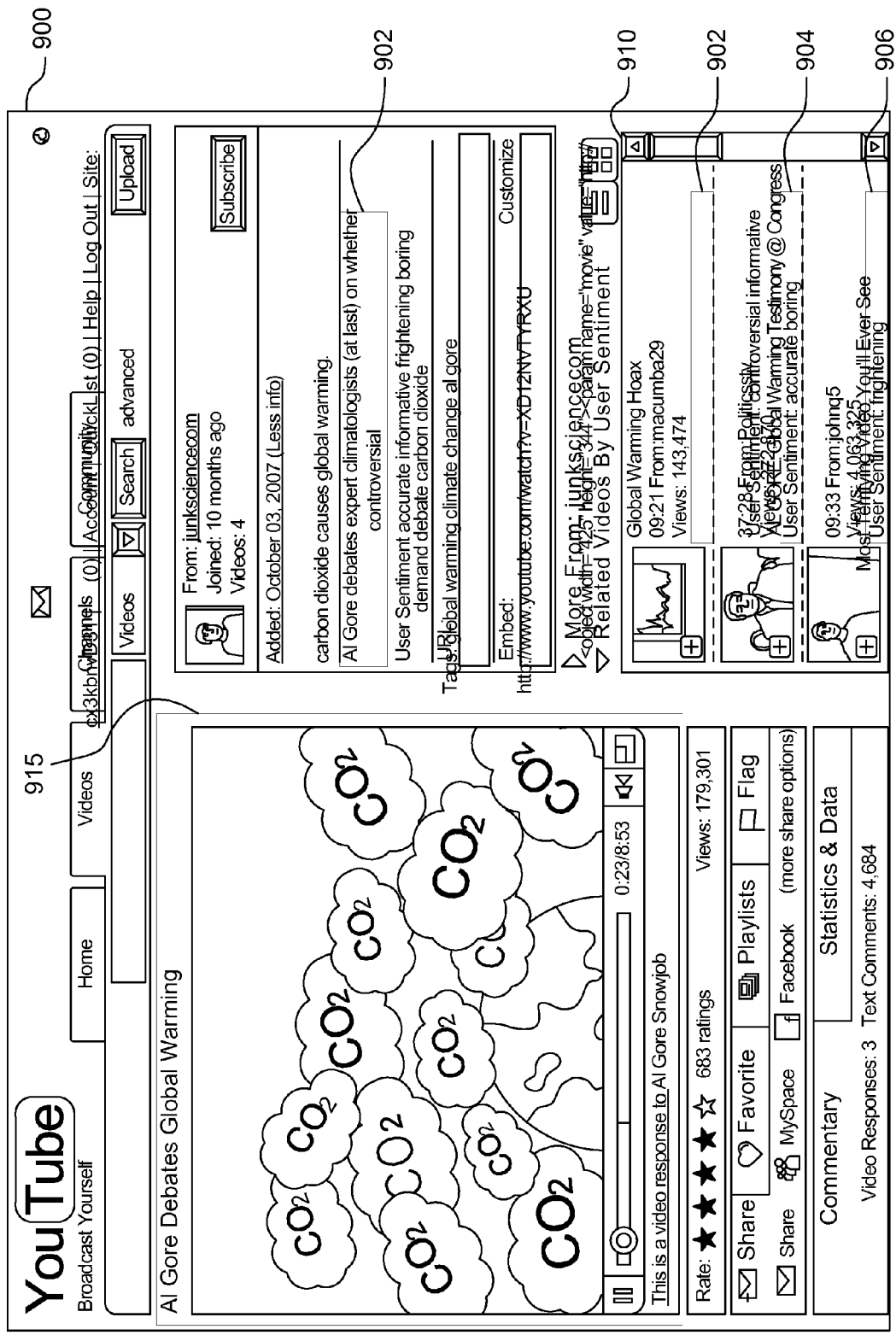
FIG. 9 illustrates a graphical user interface for displaying media content in association with sentiment profile information and related items of media content according to one embodiment.

FIG. 9 illustrates a user interface 900 for displaying an item of media content and items of related media content in association with sentiment profile information. In the user interface 900 illustrated, the media content is video content. In other embodiments, the media content may be audio content, textual content or image content.

An item of media content 915 is selected and displayed for viewing in the graphical user interface 900. When selected for viewing, information indicating the types of sentiment expressed in comments associated with the item of media content 902 is displayed in association with the item of media content 915 in the graphical user interface 900.

Upon selection of the item of media content for display, a set of related items of media content is retrieved by the content comment server 104 and provided for display. The content comment server 104 identifies a set of related items of media content based on sentiment similarity scores stored in the sentiment profile database 390 which indicate a high similarity between the sentiment profiles of the related items of media content and the selected item of media content. In one embodiment, the content comment server 104 identifies related items of media content with sentiment similarity scores that are higher than a defined threshold. In some embodiments, the content comment server 104 identifies a defined number of related items of media content with the highest sentiment similarity scores.

In a related-items pane 910, the content comment server 104 displays the related items of media content in a ranking based on the sentiment similarity scores. Items of media content with sentiment similarity scores indicating sentiment profiles similar to that of the selected item of media content 950 are displayed in association with the types of sentiment that strongly contribute to the similarity in the sentiment profiles between the selected and related items of media content represented by the sentiment similarity scores.

Figure 10:
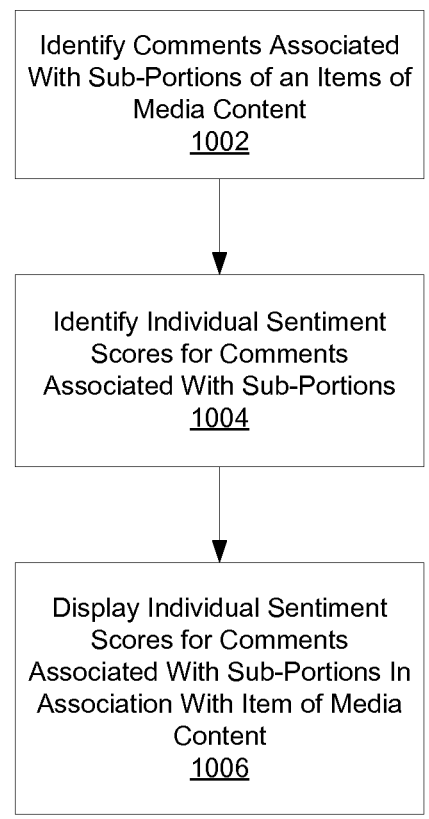
FIG. 10 is a flow chart illustrating steps performed by the content comment engine to display media content in association with individual sentiment scores associated with sub-portions of the media content according to one embodiment.

FIG. 10 is a flowchart illustrating steps performed by the content comment server 104 to display sentiment scores in accordance with an embodiment of the present invention. Other embodiments perform the illustrated steps in different orders, and/or perform different or additional steps. Moreover, some of the steps can be performed by engines or modules other than the content comment server 104.

A set of comments associated with sub-portions of an item of media content is identified 1002. Individual sentiment scores are identified 1004 for each of the comments associated with the sub-portions of the item of media content. The individual sentiment scores for the comments associated with sub-portions of the item of media content are displayed 1006 in association with the sub-portions of the item of media content on the content viewer.

Figure 11:
FIG. 11 illustrates a graphical user interface for displaying media content in association with individual sentiment scores associated with sub-portions of the media content according to one embodiment.

FIG. 11 illustrates a user interface 1100 for displaying an item of media content and items of related media content according to sentiment profile information. In the user interface 1100 illustrated, the media content is video content. In other embodiments, the media content may be audio content, textual content or image content.

The user interface contains a display window 1110 for displaying an item of media content. In the illustrated interface, the display window 1110 displays an item of temporal media content (e.g. video content). The display window 1110 further displays controls 1130 including a temporal axis corresponding to the temporal media content. Within the display window, a score display object 1120 displays individual sentiment scores for a sentiment type in association with their corresponding sub-portions of the item of media content. In the score display control 1120 illustrated, a line plot corresponding to the temporal axis is used to display binary individual sentiment scores associated to temporal sub-portions of the video associated with comments. In the example illustrated, one temporal sub-portion of the video is associated with a comment expressing the sentiment type "boring" and other temporal sub-portions of the video are not associated with comments expressing the sentiment type "boring". The temporal sub-portions of the video are indicated by their correspondence to the temporal axis representing the video.

In other embodiments, the score display object 1120 may plot individual sentiment scores indicating multiple sentiment types in a line plot over the temporal axis. In alternate embodiments, the score display object 1120 displays continuous individual sentiment scores in association with their corresponding temporal sub-portions of an item of temporal media content.

In alternate embodiments, the individual sentiment scores associated with sub-portions of an item of media content may be displayed in association with spatial data. In some embodiments, sub-portions of spatial media content such as text or images may be colored or labeled to indicate individual sentiment scores. For example, textual media content such as a news story may be colored on a gradient (e.g. from light pink to dark red) according to the magnitude of individual sentiment scores of the same type associated with sub-portions of the textual media. In this example, a paragraph or sentence associated with an individual sentiment score indicating a high degree of controversy may be colored a deeper shade of red then a paragraph or sentence with an individual sentiment score indicating that it is indicated to be mildly controversial.

Figure 12:
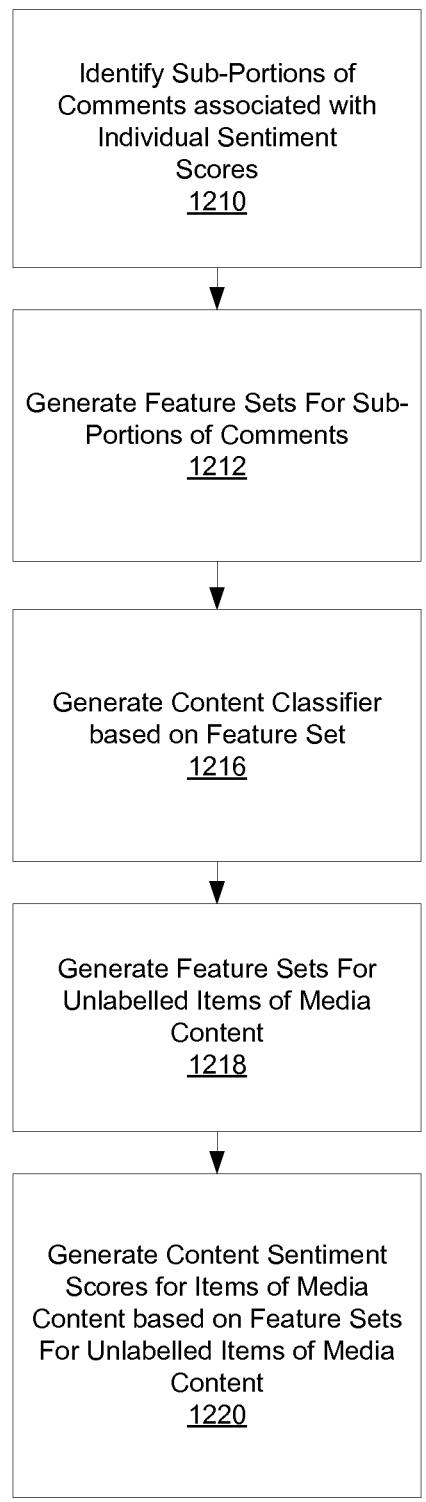
FIG. 12 is a flow chart illustrating steps performed by a content comment engine to generate content sentiment scores for items of media content according to one embodiment.

FIG. 12 is a flowchart illustrating steps performed by the content comment server 104 to generate content sentiment scores in accordance with an embodiment of the present invention. Other embodiments perform the illustrated steps in different orders, and/or perform different or additional steps. Moreover, some of the steps can be performed by engines or modules other than the content comment server 104.

The content comment server 104 identifies 1210 sub-portions of media content associated with individual sentiment scores from the sentiment profile database 390 and sentiment comment corpus 380. The content comment server 104 generates 1212 feature sets for each of the sub-portions of media content. The content comment server 104 generates 1216 content classifiers 332 for sentiment types based on the features sets for sub-portions of media content associated with individual sentiment scores indicating the sentiment types. The content comment server 104 generates 1218 feature sets for unlabelled items of media content. The content comment server 104 generates content sentiment scores 1220 for items of media content based on applying the content classifiers 332 to features generated for the unlabelled items of media content.

Figure 13:
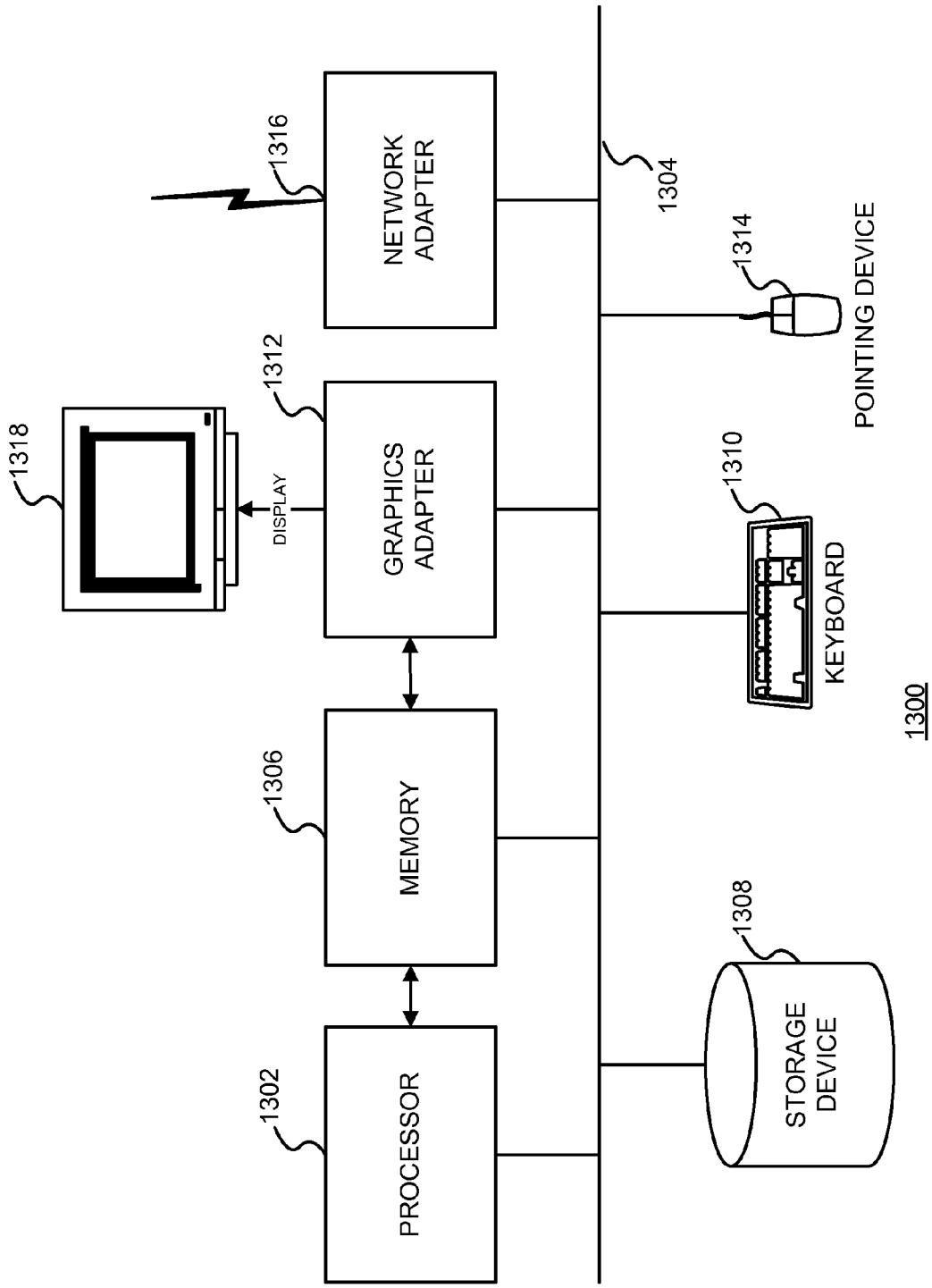
FIG. 13 is a high-level block diagram illustrating a typical computer for use as a content comment server, a content provider or a content viewer.

FIG. 13 is a high-level block diagram illustrating a typical computer 1300 for use as a content comment server 104, a content provider 102 or a content viewer 106. Illustrated are a processor 1302 coupled to a bus 1304. Also coupled to the bus 1304 are a memory 1306, a storage device 1308, a keyboard 1310, a graphics adapter 1312, a pointing device 1314, and a network adapter 1316. A display 1318 is coupled to the graphics adapter 1312.

The processor 1302 may be any general-purpose processor such as an INTEL x86 compatible-CPU. The storage device 1308 is, in one embodiment, a hard disk drive but can also be any other computer-readable storage medium capable of storing data, such as a writeable compact disk (CD) or DVD, or a solid-state memory device. The memory 1306 may be any type of computer-readable storage medium, for example, firmware, read-only memory (ROM), non-volatile random access memory (NVRAM), and/or RAM, and holds instructions and data used by the processor 1302. The pointing device 1314 may be a mouse, track ball, or other type of pointing device, and is used in combination with the keyboard 1310 to input data into the computer 1300. The graphics adapter 1312 displays images and other information on the display 1318. The network adapter 1316 couples the computer 1300 to the network 114.

As is known in the art, the computer 1300 is adapted to execute computer program modules. As used herein, the term "module" refers to computer program logic and/or data for providing the specified functionality. A module can be implemented in hardware, firmware, and/or software. In one embodiment, the modules are stored on the storage device 1308, loaded into the memory 1306, and executed by the processor 1302.

The types of computers 1300 utilized by the entities of FIG. 1 can vary depending upon the embodiment and the processing power utilized by the entity. For example, a content provider 102 that is a mobile telephone typically has limited processing power, a small display 1318, and might lack a pointing device 1314. The content comment server 104, in contrast, may comprise multiple blade servers working together to provide the functionality described herein.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the content comment server 104 may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for determining a similarity value for a plurality of items of media content, the method comprising:
   identifying a set of comments associated with a first item of media content;
   generating a set of sentiment scores associated with the set of comments, wherein each sentiment score in the set of sentiment scores is associated with one of a plurality of different types of sentiment and each sentiment score indicates a type of sentiment expressed in a comment from the set of comments;
   adjusting a sentiment score from the set of sentiment scores associated with a comment provided by a user based on information describing sentiment expressed by the user in additional comments for additional media content items;
   combining sentiment scores in the set of sentiment scores to generate a plurality of aggregate sentiment scores, each of the aggregate sentiment scores indicating a magnitude of a different type of sentiment expressed in the set of comments;
   generating a first sentiment profile responsive at least in part to the plurality of aggregate sentiment scores, the first sentiment profile indicating different types of sentiment expressed in comments associated with the first item of media content;
   identifying a second sentiment profile for a second item of media content, the second sentiment profile indicating different types of sentiment expressed in comments associated with the second item of media content;
   comparing the first sentiment profile and the second sentiment profile;
   generating a similarity value responsive at least in part to the comparison, the similarity value indicating a measure of correspondence between one or more sentiments expressed in the comments associated with the first item of media content and one or more sentiments expressed in comments associated with the second item of media content; and responsive to the generated similarity value, transmitting instructions to display the second item of media content as a related item of the first item of media item.

2. The method of claim 1, wherein generating the first sentiment profile comprises:

storing the plurality of aggregate sentiment scores as the first sentiment profile.

3. The method of claim 1, wherein each sentiment score in the set of sentiment scores is further associated with a magnitude of sentiment expressed by a comment and further comprising:

determining whether a sentiment score of the set of sentiment scores indicates that a magnitude of sentiment expressed by a comment exceeds a threshold value; and labeling the comment with a label indicating a type of sentiment indicated by the sentiment score responsive at least in part to the magnitude of sentiment exceeding the threshold value.

4. The method of claim 3, further comprising:

identifying an additional set of comments labeled with a same label;

identifying a set of information associated with the additional set of comments labeled with the same label; and generating a statistical model for a type of sentiment indicated by the label of the additional set of comments based at least in part on the set of information, wherein the statistical model is used to generate sentiment scores associated with comments that indicate whether the comments express the type of sentiment.

5. The method of claim 4, wherein the set of information comprises natural language information describing the types of sentiment expressed in the additional set of comments.

6. The method of claim 4, wherein the set of information comprises colloquial sentiment information describing the types of sentiment expressed in the additional set of comments.

7. The method of claim 1, wherein generating the set of sentiment scores associated with the set of comments comprises:

generating a set of information associated with the set of comments, wherein the set of information describes the types of sentiment expressed in the set of comments; and applying a statistical model to the set of information to generate the set of sentiment scores.

8. The method of claim 1, wherein the media content comprises video content and the set of comments are received from viewers of the video content.

9. The method of claim 1, wherein one or more comments of the set of comments are associated with sub-portions of items of media content.

10. The method of claim 9, further comprising:

identifying that the one or more comments of the set of comments associated with sub-portions of items of media content are associated with sentiment profiles indicating a same type of sentiment is expressed in the one or more comments;

generating a set of features based on the sub-portions of items of media content associated with the one or more comments, wherein the set of features is based in part on the type of media of the sub-portions of items of media content; and generating a content classifier based on the set of features, wherein the content classifier is used to generate a content sentiment score that indicates a likelihood that a type of sentiment is associated with an item of media content.

11. The method of claim 10, further comprising:

identifying a third item of media content;

generating a set of features based on the third item of media content, wherein the set of features is based in part on the type of media of the third item of media content;

generating a content sentiment score based on the set of features, wherein the content sentiment score indicates a likelihood that a type of sentiment is associated with the third item of media content; and storing the content sentiment score.

12. The method of claim 1, wherein responsive to the similarity value being greater than additional similarity values calculated for additional items of media content, transmitting the instructions to display the second item of media content as a related item of the first item of media item.

13. The method of claim 1, wherein the information describes the type of sentiment indicated by the sentiment score expressed by the user in additional comments for additional media content items and the method further comprising:

responsive to the information indicating a high frequency of the type of sentiment in the additional comments, reducing the sentiment score.

14. The method of claim 1, wherein the information describes the type of sentiment indicated by the sentiment score expressed by the user in additional comments for additional media content items and the method further comprising:

responsive to the information indicating a low frequency of the type of sentiment in the additional comments, increasing the sentiment score.

15. A non-transitory computer-readable storage medium having computer-executable code for determining a similarity value for a plurality of items of media content, the computer-executable code when executed causing steps to be performed comprising:

identifying a set of comments associated with a first item of media content;

generating a set of sentiment scores associated with the set of comments, wherein each sentiment score in the set of sentiment scores is associated with one of a plurality of different types of sentiment and each sentiment score indicates a type of sentiment expressed in a comment from the set of comments;

adjusting a sentiment score from the set of sentiment scores associated with a comment provided by a user based on information describing sentiment expressed by the user in additional comments for additional media content items;

combining sentiment scores in the set of sentiment scores to generate a plurality of aggregate sentiment scores, each of the aggregate sentiment scores indicating a magnitude of a different type of sentiment expressed in the set of comments;

generating a first sentiment profile responsive at least in part to the plurality of aggregate sentiment scores, the first sentiment profile indicating different types of sentiment expressed in comments associated with the first item of media content;

identifying a second sentiment profile for a second item of media content, the second sentiment profile indicating different types of sentiment expressed in comments associated with the second item of media content;

comparing the first sentiment profile and the second sentiment profile;

generating a similarity value responsive at least in part to the comparison, the similarity value indicating a measure of correspondence between one or more sentiments expressed in the comments associated with the first item of media content and one or more sentiments expressed in comments associated with the second item of media content; and responsive to the generated similarity value, transmitting instructions to display the second item of media content as a related item of the first item of media item.

16. The computer-readable storage medium of claim 15, wherein each sentiment score in the set of sentiment scores is further associated with a magnitude of sentiment expressed by a comment and further comprising:

determining whether a sentiment score of the set of sentiment scores indicates that a magnitude of sentiment expressed by a comment exceeds a threshold value; and labeling the comment with a label indicating a type of sentiment indicated by the sentiment score responsive at least in part to the magnitude of sentiment exceeding the threshold value.

17. The computer-readable storage medium of claim 16, further comprising:

identifying an additional set of comments labeled with a same label;

identifying a set of information associated with the additional set of comments labeled with the same label; and generating a statistical model for a type of sentiment indicated by the label of the additional set of comments based at least in part on the set of information, wherein the statistical model is used to generate sentiment scores associated with comments.

18. The computer-readable storage medium of claim 15, wherein generating the set of sentiment scores associated with the set of comments comprises:

generating a set of information associated with the set of comments, wherein the set of information describes the types of sentiment expressed in the set of comments; and applying a statistical model to the set of information to generate the set of sentiment scores.

19. A computer system for determining a similarity value for a plurality of items of media content, the system comprising:

a computer processor; and a non-transitory computer-readable storage medium having computer-executable code that when executed by the processor causes steps to be performed comprising:

identifying a set of comments associated with a first item of media content;

generating a set of sentiment scores associated with the set of comments, wherein each sentiment score in the set of sentiment scores is associated with one of a plurality of different types of sentiment and each sentiment score indicates a type of sentiment expressed in a comment from the set of comments;

adjusting a sentiment score from the set of sentiment scores associated with a comment provided by a user based on information describing sentiment expressed by the user in additional comments for additional media content items;

combining sentiment scores in the set of sentiment scores to generate a plurality of aggregate sentiment scores, each of the aggregate sentiment scores indicating a magnitude of a different type of sentiment expressed in the set of comments;

generating a first sentiment profile responsive at least in part to the plurality of aggregate sentiment scores, the first sentiment profile indicating different types of sentiment expressed in comments associated with the first item of media content;

identifying a second sentiment profile for a second item of media content, the second sentiment profile indicating different types of sentiment expressed in comments associated with the second item of media content;

comparing the first sentiment profile and the second sentiment profile;

generating a similarity value responsive at least in part to the comparison, the similarity value indicating a measure of correspondence between one or more sentiments expressed in the comments associated with the first item of media content and one or more sentiments expressed in comments associated with the second item of media content; and responsive to the generated similarity value, transmitting instructions to display the second item of media content as a related item of the first item of media item.

* * * * *